United States Patent [19]

Bergmann

[11] Patent Number: 4,775,971

[45] Date of Patent: Oct. 4, 1988

[54] OPTICAL COMMUNICATION SYSTEM

[75] Inventor: Ernest E. Bergmann, Fountain Hill, Pa.

[73] Assignee: American Telephone and Telegraph Company, AT&T Bell Laboratories, Murray Hill, N.J.

[21] Appl. No.: 844,667

[22] Filed: Mar. 27, 1986

[51] Int. Cl.⁴ .............................................. H04B 9/00
[52] U.S. Cl. ...................................... 370/3; 455/607; 455/612; 455/617; 455/618; 455/619
[58] Field of Search ............... 455/606, 607, 612, 609, 455/617, 618, 619, 605; 370/3; 350/96.15

[56] References Cited

U.S. PATENT DOCUMENTS

| | | | |
|---|---|---|---|
| 3,584,220 | 6/1971 | Nomura et al. | 455/605 |
| 4,135,202 | 1/1979 | Cutler | 358/86 |
| 4,198,118 | 4/1980 | Porter | 350/96.16 |
| 4,227,260 | 10/1980 | Vojvodich et al. | 455/607 |
| 4,267,590 | 5/1981 | Bosotti | 370/3 |
| 4,281,253 | 7/1981 | Culver | 455/607 |
| 4,289,373 | 9/1981 | Sugimoto et al. | 350/96.16 |
| 4,341,438 | 7/1982 | Seki et al. | 350/96.16 |
| 4,367,548 | 1/1983 | Cotten, Jr. et al. | 370/3 |
| 4,436,365 | 3/1984 | Hodgins et al. | 350/96.16 |
| 4,491,983 | 1/1985 | Pinnow et al. | 455/612 |
| 4,608,682 | 8/1986 | Nagashima et al. | 370/4 |
| 4,642,804 | 2/1987 | Personick | 455/605 |

FOREIGN PATENT DOCUMENTS 254991A 12/1985 Japan ..................... 370/3

OTHER PUBLICATIONS

"Integrated Optoelectronics", IEEE Spectrum, May 1982, pp. 38-45, Bar-Chaim et al.
"Subscriber Loop Architecture", AT&T Tech. Digest, Sep. 1984, pp. 9-10, Cheng et al.
IEEE Transactions on Power Apparatus & Systems, vol. PAS-99, Nr. 1, Jan.-Feb. 1980, Seiten 318-326, IEEE, New York.
"Two-Way Transmission Experiments . . . ", Electronics Letters, vol. 14, No. 11, May 1978, K. Minemura et al., pp. 340-342.
"Low Reflectance Terminals . . . ", Applied Optics, vol. 20, No. 9, May 1981, M. D. Drake, pp. 1640-1644.
U.S.; T. Takagi et al.: "Development of an Intrastation Optical-Fiber Data Transmission Systems for Electric Power Systems".

Primary Examiner—Robert L. Griffin
Assistant Examiner—L. Van Beek
Attorney, Agent, or Firm—Wendy W. Koba

[57] ABSTRACT

The present invention relates to a bidirectional optical communication system which is capable of sharing a single light source, located at a central communication point, among a large plurality of users. Additionally, the system, as defined in accordance with the present invention, requires only one single mode fiber between each user and the central location to support its bidirectional communication. The system of the present invention also has the capabilities to control the signal power sent to each subscriber, send more than one signal to each subscriber (voice and/or data and video), and switch to a back-up light source upon failure of the primary light source.

72 Claims, 4 Drawing Sheets

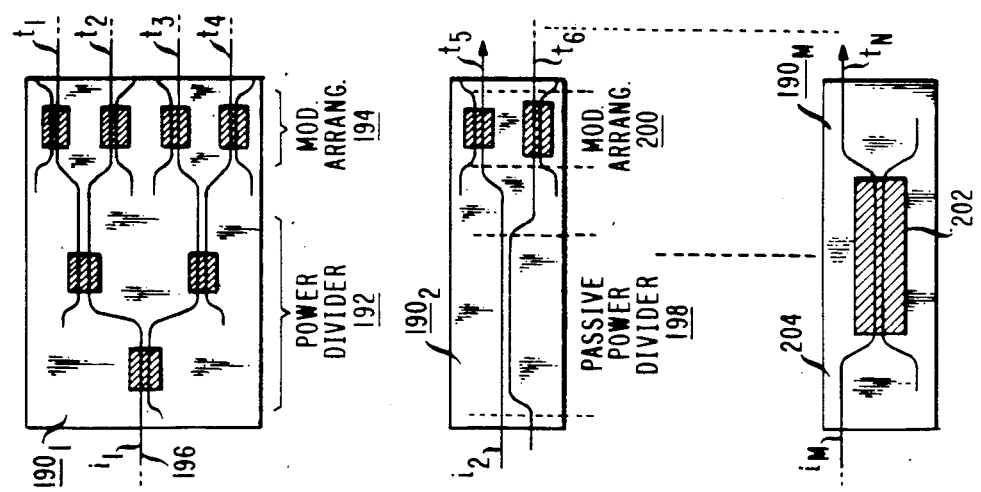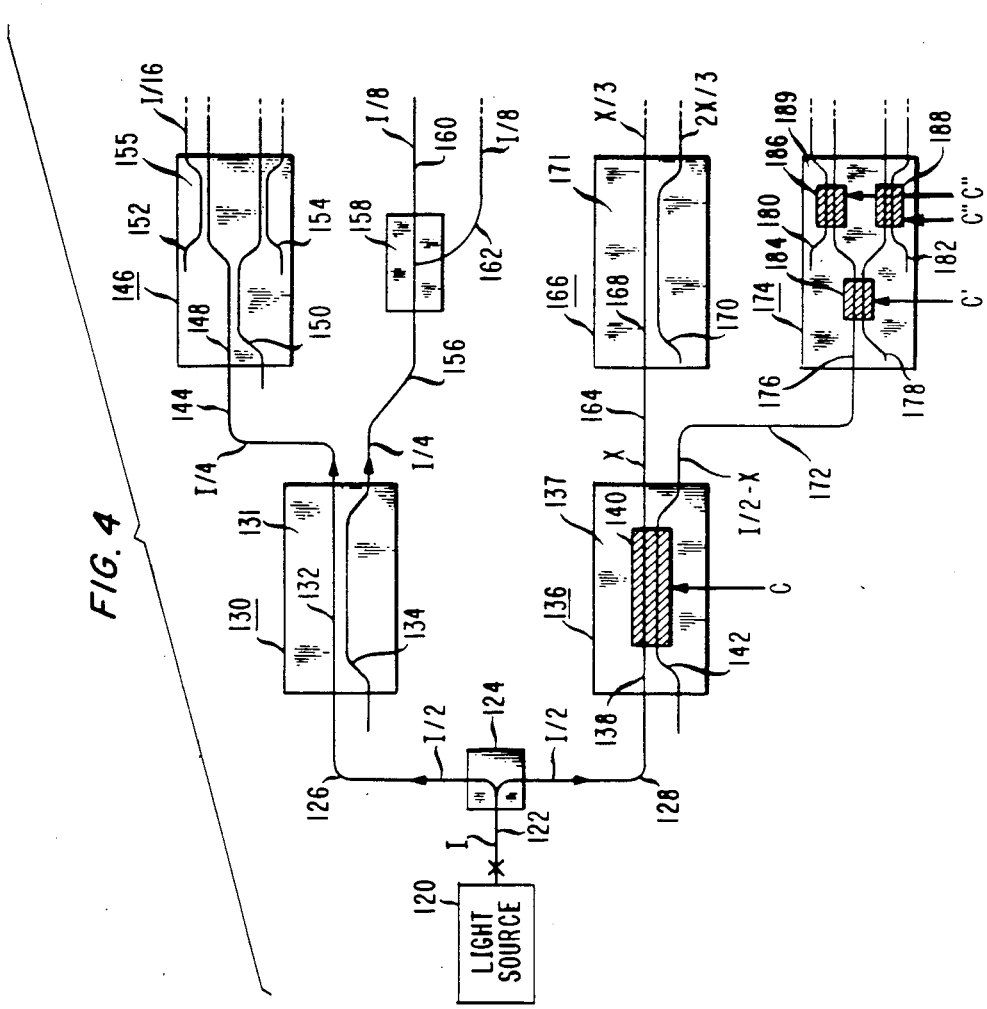
FIG. 4

OPTICAL COMMUNICATION SYSTEM

BACKGROUND OF THE INVENTION

1. Field of the Invention

The present invention relates to an optical communication system and, more particularly, to such a communication system capable of sharing a small number of light sources, located at a central communication point, among a plurality of users for providing bidirectional communication, utilizing optical fibers, between the users and the central communication point.

2. Description of the Prior Art

Light wave communication systems are continuously evolving and becoming more robust. As fiber optics enters the local loop to replace conventional copper conductors, the need arises to make these systems economically attractive for the individual subscriber. One method of minimizing cost is to reduce the number of individual fibers needed to provide two-way (i.e. bidirectional) communication between the subscriber and a central communication point (referred to as the central office). The prospect of communicating in both directions on a single optical fiber is attractive for several reasons: (1) lower cost of fiber cable, (2) ease of deployment and retrieval for portable systems, and (3) doubling of traffic capacity on existing cable lines. One such system is described in the article "Two-Way Transmission Experiments Over a Single Optical Fibre at the Same wavelength Using Micro-Optic 3 dB Couplers" by K. Minemura et al appearing in *Electronics Letters*, Vol. 14, No. 11, May 1978 at pp. 340-2. The transmission system, as described, utilizes micro-optic 3 dB couplers, a single pseudo-step-index optical fiber, GaAlAs LEDs, conventional Si PIN photodetectors, and TTL interface circuits. Although capable of achieving bidirectional communication, this arrangement requires extensive circuitry at both ends of the communication path, each end also requiring its own light source (LED) which can add significantly to the cost of the system. Many other systems exist which share at least some of these same problems (extensive circuitry, light sources at each end, a separate fiber for each signal direction, etc.).

A need remains in the prior art, therefore, for a bidirectional communication system which is inexpensive and, ideally, does not require an independent light source at each end of the communication path.

SUMMARY OF THE INVENTION

The need remaining in the prior art is addressed by the present invention which relates to an optical communication system and, more particularly, to a bidirectional optical communication system which shares a small number light sources, located at a central communication location, among a plurality of users.

It is an aspect of the present invention to utilize optical fiber, one fiber per user, to provide bidirectional communication between the central location and each remote user.

Another aspect of the present invention is to utilize integrated optical components, in particular, waveguides diffused in optical substrates, to reduce the size and complexity of the necessary equipment.

A further aspect of the present invention is the ability to provide active power division of the shared light source such that the power of the light signal sent to a particular user may be increased, decreased, or turned off completely on demand.

Yet another aspect of the present invention is the provision for a "spare" light source at the central location which may be switched into the system upon failure of the main light source, or alternatively, may be used simultaneously with the main light source to provide two different wavelengths which can then support two different information signals (e.g., voice/data and video).

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views:

FIG. 4 illustrates an alternative optical structure which may be utilized at a central communication location which is capable of sharing, through active and/or passive power division, a single light source among a large multiple of users.

DETAILED DESCRIPTION

Figure 1:
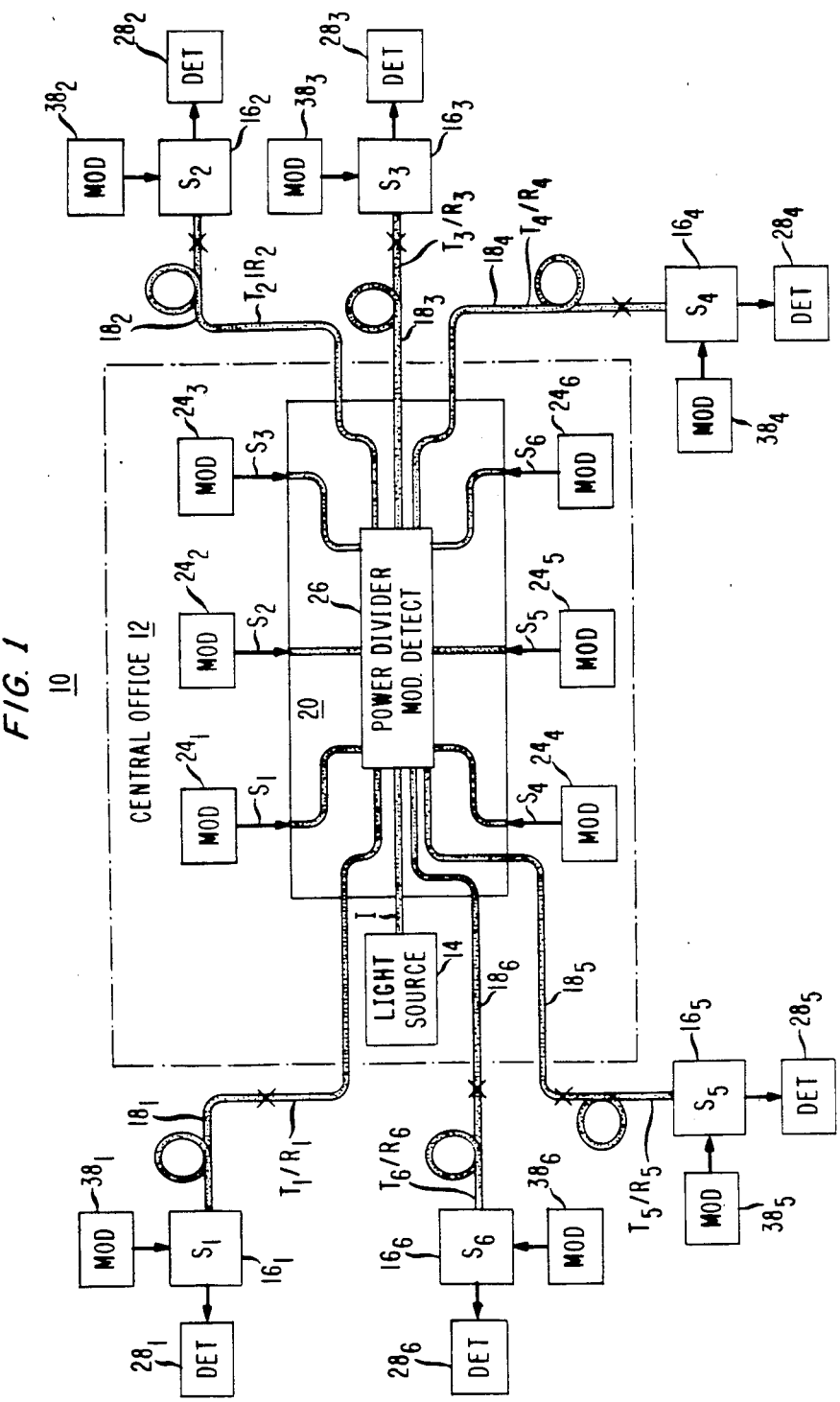
FIG. 1 illustrates in simplified block diagram form an exemplary bidirectional optical communication system utilizing a shared light source formed in accordance with the present invention.

FIG. 1 illustrates, in simplified block diagram form, an optical communication system 10 formed in accordance with the present invention. A central communication location 12, hereinafter referred to as a central office, utilizes a single light source 14 to communicate with a plurality of N subscribers 16 over a plurality of N optical fibers 18, one fiber associated with each subscriber. Light source 14 may comprise, for example, a solid-state laser (GaAs, GaAlAs, InP, etc.), an edge-emitting LED, or any other source capable of providing a carrier signal which can serve as the basis for later modulation in the creation of an information signal. Referring to central office 12, the output carrier light wave I from light source 14 is applied as an input to an optical structure 20, where structure 20 will be discussed in greater detail in association with FIGS. 2 and 4. Structure 20 is also responsive to a plurality of N modulation sources 24 which are utilized to impart the desired information $S_i$ onto carrier light wave I. As shown in block diagram form, structure 20 includes a power divider and modulation network 26 responsive to both light source 14 and modulators 24 for directing the appropriate signal $T_i$ into the associated fiber $18_i$ to subscriber $16_i$. At subscriber $16_i$, a detector $28_i$ is utilized to recover the modulated signal $T_i$, where detector $28_i$ may comprise, for example, a p-i-n photodiode, a phototransistor, or an avalanche photodiode. A modulator $38_i$ present at subscriber $16_i$ is then utilized to remodulate the received signal $T_i$ to transmit a return signal $R_i$ back to central office 12 over fiber $18_i$. A detector is included in central office 12 (not shown), similar to detector $38_i$ at subscriber $16_i$, for recovering the return information. Thus, in accordance with the present invention, two-way transmission over a single fiber is achieved between central office $12_i$ and a subscriber $16_i$, where light source 14 is shared among a plurality of subscribers 16.

An advantage of the optical communication system of the present invention is the ability to utilize integrated optical components to perform the functions briefly outlined above. The use of such components results in an extremely compact, relatively low-cost arrangement. Some penalty is paid, however, for complete integration (i.e., all necessary components formed on a single substrate) as will be discussed in detail below.

Figure 2:
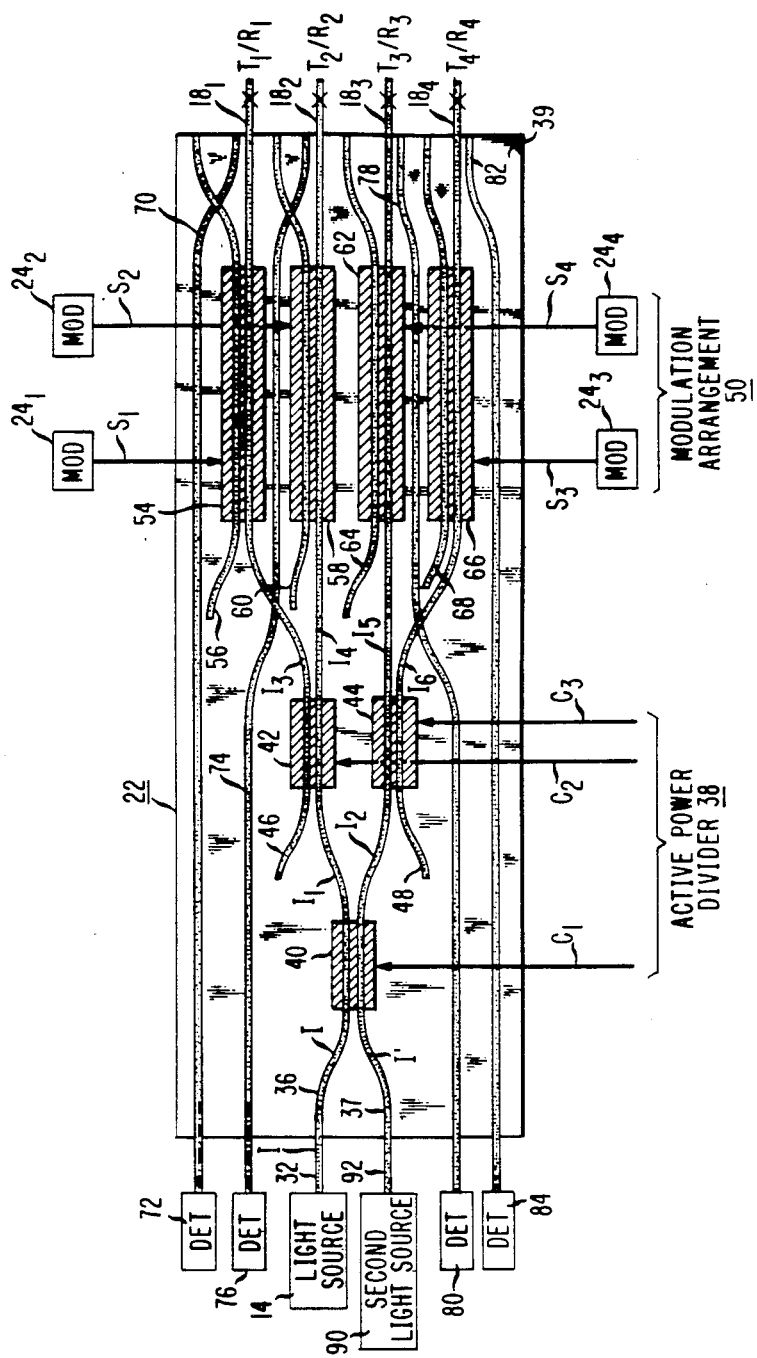
FIG. 2 illustrates an exemplary integrated optical device which may be utilized at a central communication location to provide bidirectional communication in the systems as illustrated in FIG. 1.

FIG. 2 illustrates an exemplary embodiment of a portion of central office 12 where both active power dividers and modulators are formed on a single substrate 39. It is to be noted that additional power division of the light source could be performed prior to coupling with the arrangement of FIG. 2. This would most normally take place where the light source is a laser of sufficient power to provide bidirectional communication with a large number of subscribers, for example, over a hundred subscribers. The state of the present technology allows for the optical components associated with only a small fraction of these subscribers, approximately eight, to be formed on a single optical substrate. Thus, if the total laser power were coupled into a single substrate, a significant waste of the laser's communicating ability would result. Thus, additional power division (active, passive, or any other type of well-known laser power division) can take place off-chip to provide power to a number of separate optical substrates. This aspect of the present invention will be discussed in detail later in association with FIG. 4.

Referring to FIG. 2, incoming carrier light wave I from light source 14 (where as mentioned above, carrier light wave I may comprise only a fraction of the total power of the output from light source 14) is coupled via optical fiber 32 to a waveguide 36 formed in substrate 39. Alternatively, light source 14 may be directly mounted on substrate 39 and would therefore not require the interconnecting fiber. For the sake of the present discussion, lithium niobate will be assumed as the material utilized to form substrate 39 and diffused titania as the material for forming the various waveguides in substrate 39. However, other materials, such as lithium tantalate or strontium-barium niobate with titania diffused waveguides may also be used. Carrier light wave I subsequently travels along waveguide 36 and enters an active power network 38 comprising a plurality of electrode arrays, where these arrays are illustrated in FIG. 2 by single shaded areas for the sake of clarity. It is well known that power dividers utilizing such electrode structures comprise a pair of electrodes, formed to comprise a particular geometry, depending on the crystallographic orientation of the optical substrate. For the arrangement illustrated in FIG. 2, power divider 38 comprises three electrode arrays 40, 42 and 44 utilized to divide carrier light wave I into four output signals, denoted $I_3$, $I_4$, $I_5$ and $I_6$, of predetermined power levels. By utilizing an active power divider, as explained in detail hereinafter, the power sent to different subscribers can be continuously adjusted as the need arises. Alternatively, if a known set of subscribers will never require differing power levels, a passive power divider capable of performing predetermined splitting of the incoming power level can be utilized, as described in detail later in association with FIG. 4.

In order to provide the first step in the desired power division shown in FIG. 2, an additional waveguide 37, formed as shown, is coupled with waveguide 36. An appropriate external control signal $C_1$ applied to electrode array 40 will modify the index of refraction of substrate 39 in the vicinity of array 40. This modification will cause a change in the coupling of light between waveguides 36 and 37, where the strength of control signal $C_1$ will determine the change in the amount of coupling. Thus for a predetermined value of control signal $C_1$, carrier light wave I will be partially coupled into waveguide 37, resulting in two output carriers $I_1$ and $I_2$ of predetermined power levels. The next branch of power division proceeds, as shown in FIG. 2, in two parallel paths. In particular, carrier $I_1$ appearing along waveguide 36 travels along into the vicinity of electrode array 42, where an additional waveguide 46 is utilized to provide coupling with carrier $I_1$. As explained above, for a predetermined control signal $C_2$, carrier light wave $I_1$ will partially couple into waveguide 46 to produce two separate output carriers $I_3$ and $I_4$ of predetermined power levels. Similarly, carrier light wave $I_2$ appearing along waveguide 37 enters the vicinity of electrode array 44 and in association with an additional waveguide 48 produces two separate output carriers $I_5$ and $I_6$ of predetermined power levels as controlled by the strength of control signal $C_3$.

From the above discussion, it is obvious that control signals $C_1$, $C_2$, $C_3$ may be utilized to actively optimize the performance of the system. For example, if a subscriber $16_1$ (not shown) is located relatively close to central office 12 and a subscriber $16_4$ is at a rather extreme distance, power divider network 38 may be configured, by modifying the magnitude of control signals $C_1$, $C_2$ and $C_3$, to send a signal $I_3$ of power I/8 to subscriber $16_1$ and a signal $I_6$ of power 3I/8 to subscriber $16_4$ to ensure reception of a strong signal by both subscribers. Additionally, if a particular subscriber is to be totally removed from the system, the adjustment of the appropriate control signals will cause the associated power splitters to provide power only to the remaining subscribers. Thus, as can be seen, the active power switching system of the present invention affords a great deal of continuing flexibility to the central office. Further, as stated above, if active monitoring is considered too great a burden for a given central office, passive power division may be employed, where each subscriber will receive a signal of a predetermined power level, regardless of distance from the central office. Such an arrangement might be feasible, for example, when the total communications network is contained within a portion of a large metropolitan area and the most remote subscriber will still be relatively close to the central office.

A modulation arrangement 50 as shown in FIG. 2 may be utilized to impart the desired information signal onto carriers $I_3$-$I_6$. A plurality of four modulation/information sources $24_1$-$24_4$ provides the information signals. These sources may be, for example, voice, data, and/or video information. As with power divider network 38, electrodes and waveguides may be utilized to couple the desired information into the appropriate waveguide. In particular, a first information signal $S_1$ is applied to an electrode array 54 which provides coupling between an additional waveguide 56 and carrier $I_3$ traveling along waveguide 46. The application of signal $S_1$ to electrode array 54 will thus modify carrier $I_3$ and provide the desired output signal $T_1$ which is subsequently transmitted over fiber $18_1$ to subscriber $16_1$ (not shown). Similarly, information signal $S_2$ is coupled via an electrode array 58 and waveguide 60 to carrier signal $I_4$ traveling along waveguide 36 to modulate carrier $I_4$ and generate output signal $T_2$. Output signals $T_3$ and $T_4$ are produced in a similar manner, where electrode array 62 and waveguide 64 react with carrier signal $I_5$ traveling along waveguide 37 to produce $T_3$ and electrode array 66 and waveguide 68 are associated with carrier signal $I_6$ along waveguide 48 to produce output signal $T_4$.

As discussed above, a return signal R from the subscriber (which is usually voice and/or data) travels along the same optical fiber 18 back to central office 12. The arrangement illustrated in FIG. 2 includes components capable of recovering this return signal. As shown in association with return signal $R_1$, a waveguide 70 is formed to "pick off" a portion of the returning signal which travels back along fiber $18_1$ and enters waveguide 46. Since the coupling between waveguides 70 and 46 may allow some of return signal $R_1$ to propagate along waveguide 46, the system of the present invention may be designed to prevent an appreciable amount of this propagation. For example, the transmitted signal $T_1$ may be formed to comprise a first polarization, for example, TM (transverse magnetic), and return signal $R_1$ to comprise the orthogonal TE polarization (transverse electric). Thus, return waveguide 70 would be completely transparent to transmitted signal $T_1$ and would pick off 100% of return signal $R_1$. Alternatively, if the polarization of the signals cannot be controlled at the subscriber or maintained along the length of fiber $18_1$ between central office 12 and subscriber $16_1$, an active polarization controlling component may be included at the coupling between fiber $18_1$ and waveguide 46 (not shown) to provide the desired polarity to return signal $R_1$. It is to be understood, however, that these and other means of maintaining a predetermined polarization of signals $T_1$ and $R_1$ are utilized only to improve the system performance, since the propagation of a portion of return signal $R_1$ along waveguide 46 will not destroy the communication path. The only harm to the system is in terms of the power degradation of the return signal coupled into waveguide 70.

As shown in FIG. 2, a photodetector 72 is coupled to waveguide 70 to recover signal $R_1$. As with detectors 28 of FIG. 1, detector 72 may comprise a p-i-n photodiode, a phototransistor, an avalanche photodiode, or any other arrangement capable of converting a received optical signal into an associated electrical signal. In a similar manner, return signal $R_2$ from subscriber $16_2$ may be recovered utilizing a waveguide 74 and detector 76, configured as shown in FIG. 2. Likewise, to recover the signals transmitted by subscribers $16_3$ and $16_4$, return signal $R_3$ is coupled via a waveguide 78 to a detector 80 and return signal $R_4$ is coupled via a waveguide 82 to a detector 84.

As mentioned above, an additional aspect of the present invention is the ability to provide a "spare" light source at the central office which can be switched in when the first fails. Alternatively, this spare light source may be utilized to provide a pair of transmitters which operate simultaneously and may utilize different transmitting wavelengths, for example, to transmit two different messages to one subscriber over the same fiber. Other various uses of a spare light source are obvious.

This provision is illustrated in FIG. 2 by additional light source 90 coupled via a optical fiber 92 to waveguide 37 (where light source 90 may also be directly mounted on substrate 39). Therefore, if light source 14 fails, second source 90 will be activated to provide the input carrier light wave I' which will travel through the same waveguide structure as discussed above and subsequently form output signals $T_1$-$T_4$. If, as mentioned above, it is desired to operate both sources 14 and 90 simultaneously (source 14 providing an output carrier $I_A$ at a wavelength $\lambda_A$, source 90 providing an output carrier $I_B$ at a wavelength $\lambda_B$, $\lambda_A \neq \lambda_B$), power divider network 38 may be controlled to actively switch between the two sources. In particular, for the arrangement shown in FIG. 2, control signal $C_1$ is used to control the degree of coupling between waveguides 36 and 37 and thus provide transmission of either carrier $I_A$ or carrier $I_B$ along the remaining signal paths. As a further extension of this aspect, it is obvious that yet additional light sources could be incorporated into the system of the present invention as "spares" if it is desired to simultaneously employ both souces 14 and 90.

Figure 3:
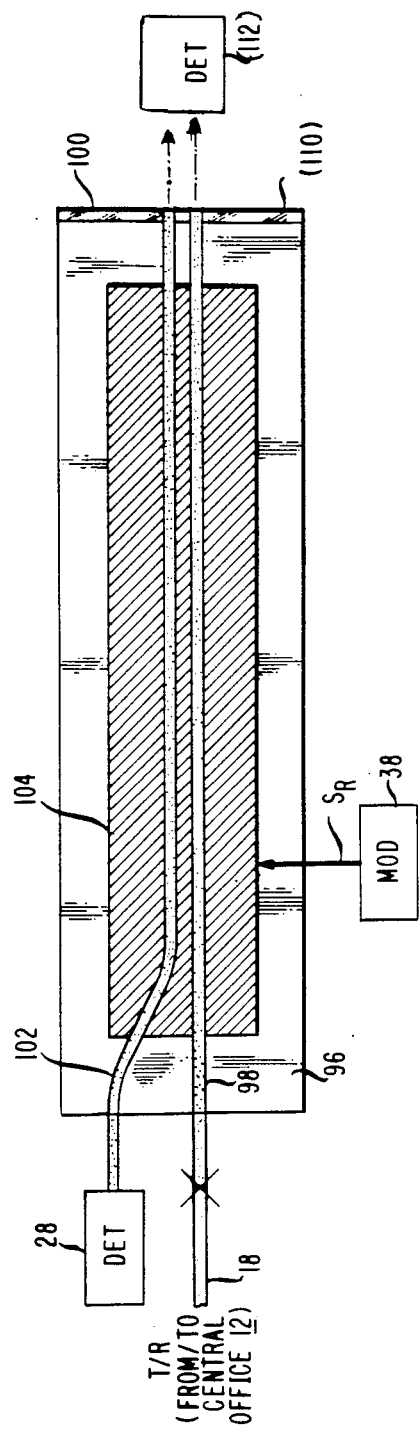
FIG. 3 illustrates an exemplary integrated optical device which may be utilized at a remote location to provide bidirectional communication for the system of the present invention as illustrated in FIG. 1.

An exemplary subscriber arrangement 16 for use in accordance with the present invention is illustrated in FIG. 3. As with the central office configuration illustrated in FIG. 2, the subscriber arrangement utilizes an optical substrate 96, for example, lithium niobate, to aid in both recovering the transmitted signal and forming the return information signal. Referring to FIG. 3, transmitted signal T from central office 12 travels along optical fiber 18 which is coupled at subscriber 16 to a waveguide 98 (preferably comprising diffused titanium) formed in substrate 96. To recover the transmitted information, signal T may travel the length of substrate 96 and be reflected off of a mirror 100 to travel back along coupled waveguides 98 and 102 into detector 28 and toward fiber 18, where the details of detector 28 were previously discussed. In order to impart return information to incoming signal T, external modulator 38 (which is usually a source of voice and/or data information) is applied to an electrode array 104 formed on substrate 96. As with the modulators present at central office 12, the information signal $S_R$ from modulator 38 will alter signal T and form the return information signal R. Thus, by utilizing the incoming signal form central office 12 as the carrier for the return message signal, subscriber 16 does not require a separate light source to generate return signal R. This bidirectional aspect of the present invention realizes a great saving in cost in terms of the equipment needed at the subscriber's location.

As discussed above, it is possible that information from two sources may be broadcast over fiber 18 to subscriber 16. For example, one signal may represent video information and the other represent voice and/or data. In this instance, therefore, subscriber 16 must include additional components capable of handling both incoming signals. One exemplary arrangement capable of performing this task is also illustrated in FIG. 3, where a totally reflective mirror 100 is replaced with a partially reflective mirror 110, also referred to as a dichroic mirror 110. Mirror 110 is chosen such that the wavelength associated with a first of the transmitted signals will be reflected completely and routed over waveguides 98 and 102, as described above, into detector 28 and, also, back along waveguide 98 to form the carrier for the return signal. However, the second, remaining information signal will pass through unaffected by mirror 110 and into a second photodetector 112, where the information is extracted from the signal. In a practical application, the first signal could be voice and/or data, where the subscriber wishes to send a return signal back to the central office. The second signal, which in the embodiment described above is a one-way transmission, could be video, where it is unlikely that a subscriber would want to broadcast video back to the central office. However, additional components, in particular an additional electrode array and modulator, could be added to the arrangement of FIG. 3 to provide a means for bidirectional video communication and such is well within the scope of the present invention.

In most systems utilizing the teachings of the present invention, the input light source will be a laser, edge-emitting LED, or other high-power device. As previously mentioned, a large portion of this input power could be wasted if off-chip power division methods are not utilized. For example, a high power conventional laser can easily support bidirectional communication with over a hundred separate subscribers. Current techniques of forming integrated optical components, however, limit the number of subscribers which can be supported on a single substrate to approximately eight. Thus, a laser power over ten times that required is being transmitted between the central office and the subscribers. Therefore, to maximize the use of the laser, many sequences of power division may be performed to reduce the input power level to an individual substrate and hence allow a single laser to be shared among a plurality of separate optical substrates.

An exemplary power division arrangement for use at a central office 12 to provide the sharing of a single light source among a plurality of N subscribers, with optical components formed on a plurality of separate substrates, is illustrated in FIG. 4. It is to be understood that the arrangement is exemplary only, for the purposes of illustrating various power division techniques and combinations thereof, and many other variations exist which are obvious to those skilled in the art and are deemed to fall within the scope of the present invention. Referring to FIG. 4, the primary light source is defined to be a laser 120 which emits an output light of intensity I. This output light is passed through an optical fiber 122 and enters a fused fiber coupler 124 where the power is divided into components of equal value I/2. Alternatively, fused fiber coupler may be designed to provide any desired power split. Fused fiber couplers themselves are well known in the art, one example being that disclosed in U.S. Pat. No. 4,431,260 issued to J. P. Palmer on Feb. 24, 1984. One of the output light waves from fused fiber coupler 124 subsequently travels along a fiber 126 and enters an integrated power splitter 130, which may be formed on a lithium niobate substrate 131. Power splitter 130 as illustrated in FIG. 4 is a passive device, where the splitting ratio between the two output light waves is fixed when power splitter 130 is formed. Input light wave along fiber 126 enters a first waveguide 132 formed in substrate 131. A second waveguide 134 is also formed in substrate 131 and is positioned relative to waveguide 132 such that a coupling of the light signal takes place, providing a pair of separate output light waves, each having a predetermined power level, where equal power levels of I/4 are shown for the sake of illustration in FIG. 4.

The second, remaining output from fused fiber coupler 124 travels along a fiber 128 and enters a second power splitter 136. Like power splitter 130 previously described, second power splitter 136 is an integrated optical device formed on an optical substrate 137. However, unlike power splitter 130, second power splitter 136 is an active device capable of providing any predetermined ratio of power splitting. As shown in FIG. 4, power splitter 136 includes a first waveguide 138 coupled to receive the input light wave traveling along fiber 128. An electrode array 140 is positioned over a portion of waveguide 138 and a second waveguide 142 is formed to couple a portion of the light traveling along waveguide 138, as controlled by the application of a control signal C to electrode array 140. The two output signals from power splitter 136, therefore, will comprise power levels as controlled by signal C, where these power levels are designated as X and I/2−X in FIG. 4.

For a high power laser source, many further power divisions may be performed before proceeding with the actual modulation to create the information signals sent to the subscribers. One additional branch of power splitting is illustrated in FIG. 4 for the sake of discussion, with the dotted lines indicating the presence of further power splitting. In particular, an additional passive power splitter 146 is illustrated as responsive to a first output from power splitter 130 traveling along a fiber 144, where passive power splitter 146 comprises a set of waveguides 148, 150, 152 and 154 disposed as shown on an optical substrate 155 to form a set of four separate output signals, where in one embodiment each of these signals may have an equal power level of I/16. Another fused fiber coupler 158 is shown as responsive to remaining I/4 power level output from power splitter 130 traveling along a fiber 156. As shown, fused fiber coupler 158 provides two separate output light waves of I/8 power along a pair of fibers 160 and 162. The first output of power X from active power splitter 136 which travels along a fiber 164 is subsequently applied as an input to a passive power splitter 166 including a pair of waveguides 168 and 170 formed on an optical substrate 171. As shown in FIG. 4, this particular power splitter is designed to provide a 1:2 power split. The remaining output from active power splitter 136 is shown as traveling along a fiber 172 and being applied as an input to another active power splitter 174, where power splitter 174 includes a plurality of waveguides 176, 178, 180 and 182 and a plurality of electrode arrays 184, 186 and 188 arranged as shown on an optical substrate 189 to provide four output light waves of controllable power levels, as controlled by a set of signals C′, C″, and C‴ connected as shown to electrode arrays 184, 186 and 188.

When a sufficient amount of power division has been performed, the light wave carrier signals are applied as separate inputs to a plurality of modulating components $190_1$–$190_M$, as shown in FIG. 4, where each modulating component may include a different arrangement, three exemplary arrangements being illustrated in FIG. 4. In particular, modulating component $190_1$ is illustrated as being similar to optical structure 20 illustrated in FIG. 2, including an active power dividing network 192 and a modulating arrangement 194. As with the arrangement illustrated in FIG. 2, the input light carrier $i_1$ traveling along a single mode fiber 196 and is coupled to the waveguides forming power dividing network 192 and is subsequently modulated using modulating sources (not shown) to provide output transmission signals $t_1$–$t_4$. Although not shown, it is to be understood that modulating component $190_1$, as well as the remaining modulating components, comprise a demodulating arrangement for recovering the return signal transmitted to central office 12 from each subscriber 16. Modulating component $190_2$ is illustrated as a variation of component $190_1$, where the active power division is replaced with a passive power dividing arrangement 198. A similar modulating network 200 is utilized to produce a pair of output transmission signals $t_5$ and $t_6$. Lastly, a simple modulating component $190_M$ is illustrated as comprising only a single electrode array 202 formed on an optical substrate 204 and controlled by an external modulation signal to form output transmission signal $t_N$.

In conclusion, the present invention provides a bidirectional optical communication system which is capable of sharing a single light source, located at a central communication point, among a large plurality of users. Additionally, the system, as described above, requires only one optical fiber between each user and the central location to support its bidirectional communication. Lastly, the system of the present invention has the capabilities to control the signal power sent to each subscriber, send more than one signal to each subscriber (voice and/or data and video), and switch to a back-up light source upon failure of the primary light source.

What is claimed is:

1. An optical communication system for providing bidirectional communication between a central location and a plurality of N remote locations operable with a single shared light source located at said central location and a single optical fiber between said central location and each remote location, said optical transmission system comprising a central location structure including adjustable power dividing means responsive to said single shared light source for providing a plurality of M output carrier light waves, each carrier light wave of a power level determined by the adjustment;

a plurality of M modulating means, responsive to both said plurality of M carrier light wave outputs and a plurality of N modulating signals from a plurality of N information sources, for generating a plurality of N output transmission signals to be transmitted to said plurality of N remote locations over said associated optical fibers; and a plurality of N return signal recovery means, each return signal recovery means responsive to a separate one of the return information signals transmitted from said plurality of N remote locations to said central location; and each remote location of said plurality of N remote locations comprises detection means for recovering the associated modulating signal of the associated central location information source from said output transmission signal; and modulation means responsive to a return modulation signal from a remote location information source for remodulating said output transmission signal to form said return information signal transmitted to said central location over said associated optical fiber.

2. An optical communication system as defined in claim 1 wherein the central location further comprises at least one additional shared light source and switching means capable of coupling said at least one additional shared light source to the adjustable power dividing means.

3. An optical communication system as defined in claim 2 wherein the at least one additional shared light source is a spare light source and the switching means is capable of coupling said second light source to the adjustable power dividing means upon failure of the first shared light source.

4. An optical communication system as defined in claim 2 wherein the at least one additional shared light source operates at a different wavelength than the first shared light source and both light sources are utilized simultaneously to transmit separate information signals to the plurality of remote locations.

5. An optical communication system as defined in claim 2 wherein the at at least one additional shared light source comprises a plurality of separate light sources, each operating at a different wavelength.

6. An optical communication system as defined in claim 2 wherein the at least one additional shared light source comprises a spare light source operating at the same wavelength as the first shared light source and a plurality of additional light sources operating at different wavelengths.

7. An optical communication system as defined in claims 1 or 2 wherein the central location adjustable power dividing means comprises at least one integrated optical power divider including a plurality of optical waveguides formed on an optical substrate, one waveguide responsive to the first shared light source, said plurality of waveguides disposed in a manner to form a plurality of output carrier light waves, each light wave of an adjustable power fraction of the input power from said first shared light source.

8. An optical communication system as defined in claim 7 wherein the at least one integrated optical power divider is a passive power divider for providing a constant power division throughout the plurality of waveguides such that each output carrier light wave comprises a constant power fraction.

9. An optical communication system as defined in claim 7 wherein the least one integrated optical power divider includes an active power divider capable of constantly changing the power fractions associated with the plurality of output carrier waves, said active power divider further comprises a plurality of electrode arrays disposed over a major surface of said optical substrate in relation to the plurality of optical waveguides, said plurality of electrode arrays capable of being connected to a plurality of external control signals, wherein said control signals affect the refactive index of said optical substrate in the vicinity of said plurality of electrode arrays so as to control the degree of coupling among the plurality of waveguides and thus modify the power fraction associated with the plurality of output carrier light waves.

10. An optical communication system as defined in claim 7 wherein the at least one integrated optical power divider includes a second waveguide capable of receiving the carrier output from the at least one additional shared light source.

11. An optical communication system as defined in claim 7 wherein the optical substrate comprises lithium niobate.

12. An optical communication system as defined in claim 7 wherein the optical waveguides comprise titanium diffused into the optical substrate.

13. An optical communication system as defined in claim 1 wherein at least one modulating means of the central location plurality of modulating means comprises an optically integrated modulating means formed on an optical substrate including a plurality of optical waveguides diffused into a top major surface of said optical substrate, one waveguide of said plurality of optical waveguides responsive to the carrier light wave output of an associated power dividing means; and a plurality of electrode arrays formed on said top major surface, said plurality of electrode arrays responsive to the plurality of modulating signals produced by the associated plurality of external information sources, said signals capable of modulating the refractive index of said optical substrate in the vicinity of said electrode arrays so as to form the plurality of output transmission signals.

14. An optical communication system as defined in claim 13 wherein the integrated modulating means optical substrate comprises lithium niobate.

15. An optical communication system as defined in claim 13 wherein the plurality of optical waveguides comprises titanium diffused into the top major surface of the optical substrate.

16. An optical communication system as defined in claim 1 wherein the central location plurality of N return signal recovery means comprises at least one optically integrated return signal recovery means formed on an optical substrate.

17. An optical communication system as defined in claim 16 wherein the at least one optically integrated return signal recovery means comprises at least one optical waveguide diffused into a top major surface of the optical substrate, said at least one waveguide capable of receiving a separate one of the plurality of N return information signals transmitted from the plurality of N remote locations to the central communication location; and at least one optical detector associated in an one-to-one relationship with said at least one optical waveguide for recovering the information from said return information signal.

18. An optical communication system as defined in claim 17 wherein the at least one optical waveguide comprises titanium diffused into the optical substrate.

19. An optical communication system as defined in claim 16 wherein the optical substrate comprises lithium niobate.

20. An optical communication system as defined in claims 1 or 2 wherein at least one remote location of the plurality of N remote locations is an optically integrated remote location entirely formed on an optical substrate.

21. An optical communication system as defined in claim 20 wherein the detection means of the at least one optically integrated remote location comprises a first waveguide diffused into a top major surface of the optical substrate capable of receiving the transmitted output signal sent by the central location over the associated optical fiber;

photodetection means for recovering the information present in said transmitted output signal; and reflecting means for redirecting said transmitted output signal present in said first waveguide into at least said photodetection means.

22. An optical communication system as defined in claim 21 wherein the first waveguide comprises titanium diffused into the optical substrate.

23. An optical communication system as defined in claim 22 wherein the reflecting means comprises a second waveguide disposed in the optical substrate and coupled to the photodetection means; and mirroring means disposed in conjunction with said optical substrate for reflecting the signal present along the first waveguide into at least said second waveguide.

24. An optical communication system as defined in claim 23 wherein the mirroring means is a dichroic mirror capable of reflecting a first information signal into the photodetection means and transmitting a second information signal into a second photodetection means when both the shared first light source and the second shared light source are utilized by the central location.

25. An optical communication system as defined in claim 23 wherein the first and second waveguides comprise titanium diffused into the optical substrate.

26. An optical communication system as defined in claim 21 wherein the detection means optical substrate comprises lithium niobate.

27. An optical communication system as defined in claim 20 wherein the modulation means of the at least one optically integrated remote location comprises an electrode array disposed over a top major surface of the optical substrate responsive to the return modulation signal from the remote location external information source for modulating the refractive index of the optical substrate in the vicinity of said electrode array to form the return information signal.

28. An optical communication system as defined in claim 1 wherein the first shared light source comprises a laser.

29. An optical communication system as defined in claim 2 wherein the first shared light source and the at least one additional shared light source comprise laser light sources.

30. An optical communication system as defined in claim 1 wherein the first shared light source comprises an edge-emitting light emitting diode.

31. An optical communication system as defined in claim 2 wherein the first shared light source and the at least one additional shared light source comprise second edge-emitting light emitting diodes.

32. An optical communication system as defined in claims 1 or 2 wherein the central location plurality of N return signal recovery means and at least one remote location detection means comprise p-i-n photodiodes.

33. An optical communication system as defined in claims 1 or 2 wherein the central location plurality of N return signal recovery means and at least one remote location detection means comprise avalanche photodiodes.

34. An optical communication system as defined in claims 1 or 2 wherein the plurality of N transmitted signals comprises a first polarity and the plurality of N return signals comprises a second polarity orthogonal to said first polarity.

35. An optical communication system as defined in claim 34 wherein the first polarity is transverse magnetic (TM) and the second polarity is transverse electric (TE).

36. An optical communication system as defined in claim 34 wherein the first polarity is tranverse electric (TE) and the second polarity is transverse magnetic (TM).

37. A central location of an optical communication system for providing bidirectional communication with a plurality of N remote locations operable with a single shared light source located at said central location and a single optical fiber between said central location and each remote location, said central location comprising adjustable power dividing means responsive to said single shared light source for providing a plurality of M output carrier light waves, each carrier light wave of a power level determined by the adjustment;

a plurality of M modulating means responsive to both said plurality of M carrier light wave output signals of said power dividing means and a plurality of N modulating signals from a plurality of N information sources, for generating a plurality of N output transmission signals to be transmitted to said plurality of N remote locations over said associated optical fibers; and a plurality of N return signal recovery means, each return signal recovery means responsive to a separate one of the return information signals transmitted from said plurality of N remote locations to said central location.

38. A central location of an optical communication system as defined in claim 37 wherein said central location further comprises at least one additional shared light source and switching means capable of coupling the second shared light source to the adjustable power dividing means.

39. A central location of an optical communication system as defined in claim 38 wherein the at least one additional shared light source is a spare light source and the switching means is capable of coupling said spare light source to the adjustable power dividing means upon failure of the first shared light source.

40. A central location of an optical communication system as defined in claim 38 wherein the at least one additional shared light source operates at a different wavelength than the first shared light source and both light sources are utilized simultaneously to transmit separate information signals.

41. An optical communication system as defined in claim 38 wherein the at least one additional shared light source comprises a plurality of separate light sources, each operating at a different wavelength.

42. An optical communication system as defined in claim 38 wherein the at least one additional shared light source comprises a spare light source operating at the same wavelength as the first shared light source and a plurality of additional light sources operating at different wavelengths.

43. A central location of an optical communication system as defined in claims 37 or 38 wherein the adjustable power dividing means comprises at least one integrated optical power divider including a plurality of optical waveguides formed on an optical substrate, one waveguide responsive to the first shared light source, said plurality of waveguides disposed in a manner to form a plurality of output carrier light waves, each light wave of an adjustable power fraction of the input power from said first shared light source.

44. A central location of an optical communication system as defined in claim 43 wherein the at least one integrated optical power divider is a passive power divider for providing a constant power division throughout the plurality of waveguides such that each output carrier light wave comprises a constant power fraction as a function of time.

45. A central location of an optical communication system as defined in claim 43 wherein the at least one integrated optical power divider is an active power divider capable of constantly changing the power fractions associated with the plurality of output carrier saves, said active power divider further comprising a plurality of electrode areas disposed over a major surface of the optical substrate in relation to the plurality of waveguides, said plurality of electrode arrays capable of being connected to a plurality of control signals, wherein said control signals affect the refractive index of said optical substrate in the vicinity of said plurality of electrode arrays so as to control the degree of coupling among the plurality of waveguides and thus modify the power fraction associated with the plurality of output carrier light waves.

46. A central location of an optical communication system as defined in claim 43 wherein the at least one integrated optical power divider includes a second waveguide capable of receiving the carrier output from the at least one additional shared light source.

47. A central location of an optical communication system as defined in claim 43 wherein the optical substrate comprises lithium niobate.

48. A central location of an optical communication system as defined in claim 43 wherein the plurality of waveguides comprise titanium diffused into the optical substrate.

49. A central location of an optical communication system as defined in claim 37 wherein at least one modulating means of the plurality of M modulating means comprises an optically integrated modulating means formed on an optical substrate including a plurality of optical waveguides diffused into a top major surface of said optical substrate, one waveguide of said plurality of optical waveguides responsive to the carrier light wave output of an associated power dividing means; and a plurality of electrode arrays formed on said top major surface, said plurality of electrode arrays responsive to the plurality of modulating signals produced by the associated plurality of external information sources, said signals capable of modulating the refractive index of said optical substrate in the vicinity of said electrode arrays so as to form the plurality of output transmission signals.

50. A central location of an optical communication system as defined in claim 49 wherein the integrated modulating means optical substrate comprises lithium niobate.

51. A central location of an optical communication system as defined in claim 49 wherein the plurality of optical waveguides comprises titanium diffused into the optical substrate.

52. A central location of an optical communication system as defined in claim 37 wherein at least one return signal recovery means of the plurality of N return signal recovery means comprises an optically integrated return signal recovery means formed on an optical substrate comprising at least one optical waveguide diffused into a top major surface of said optical substrate, said at least one optical waveguide capable of receiving a separate one of the plurality of N return information signals transmitted from the plurality of N remote locations to said central location; and at least one optical detector associated in a one-to-one relationship with said at least one optical waveguide for recovering the information from said return information signal.

53. A central location of an optical communication system as defined in claim 52 wherein the optical substrate comprises lithium niobate.

54. A central location of an optical communication system as defined in claim 52 wherein the at least one optical detector comprises titanium diffused into the optical substrate.

55. A central location of an optical communication system as defined in claim 52 wherein the at least one optical detector comprises a p-i-n photodiode.

56. A central location of an optical communication system as defined in claim 52 wherein the at least one optical detector comprises an avalanche photodiode.

57. A central location of an optical communication system as defined in claim 37 wherein the first shared light source comprises a laser.

58. A central location of an optical communication system as defined in claim 37 wherein the first shared light source comprises an edge-emitting light emitting diode.

59. A central location of an optical communication system as defined in claim 38 wherein the first shared light source and the at least one additional shared light source comprise light sources laser.

60. A central location of an optical commuication system as defined in claim 38 wherein the first shared light source and the at least one additional shared light source comprise edge-emitting light emitting diodes.

61. A central location of an optical communication system as defined in claims 37 or 38 wherein the plurality of N transmission output signals comprise a first polarity and the plurality of N return signals comprise a second polarity opposite to said first polarity.

62. A central location of an optical communication system as defined in claim 61 wherein the first polarity is transverse magnetic (TM) and the second polarity is transverse electric (TE).

63. A central location of an optical communication system as defined in claim 61 wherein the first polarity is transverse electric (TE) and the second polarity is transverse magnetic (TM).

64. A remote location of an optical communication system capable of receiving information from and transmitting information to a central location over a single optical fiber, operable with a single light source located at said central location and shared among a plurality of remote locations, said remote locations comprising
   detection means for recovering an information signal from a central location transmitted signal; and
   modulation means responsive to a return modulation signal from an information source for remodulating said central location transmitted signal to form a return information signal transmitted over said single optical fiber to said central location.

65. A remote location of an optical communication system as defined in claim 64 wherein said remote location comprises an optically integrated structure formed entirely on an optical substrate.

66. A remote location of an optical communication system as defined in claim 65 wherein the optically integrated structure comprises
   a first waveguide diffused into a top major surface of the optical substrate capable of receiving the central location transmitted signal;
   first photodetection means for recovering the information present in said central location transmitted signal; and
   reflecting means for redirecting said transmitted signal present in said first waveguide into at least said first photodetection means.

67. A remote location of an optical communication system as defined in claim 66 wherein the reflecting means comprises
   a second waveguide diffused in the top major surface of the optical substrate and coupled to the first photodetection means; and
   mirroring means disposed in conjunction with said optical substrate for reflecting the central location transmitting signal into said second waveguide.

68. A remote location of an optical communication system as defined in claim 67 wherein the reflecting means further comprises
   second photodetection means for recovering the information present in a second transmitted signal; and
   dichroic mirroring means capable of reflecting a first transmitted signal into the first photodetection means and said second transmitted signal into said second photodetection means.

69. A remote location of an optical communication system as defined in claim 65 wherein the modulating means comprises an electrode array disposed over a top major surface of the optical substrate responsive to a return modulation signal from the external information source for modulating the refractive index of said optical substrate in the vicinity of said electrode array to from the return information signal.

70. A remote location of an optical communication system as defined in claim 65 wherein the optical substrate comprises lithium niobate.

71. A remote location of an optical communication system as defined in claim 67 wherein the first waveguide comprises titanium diffused into the optical substrate.

72. A remote location of an optical communication system as defined in claim 67 wherein the first waveguide and the second waveguide comprise titanium diffused into the optical substrate.

* * * * *